United States Patent
Li et al.

(10) Patent No.: US 11,954,455 B2
(45) Date of Patent: Apr. 9, 2024

(54) METHOD FOR TRANSLATING WORDS IN A PICTURE, ELECTRONIC DEVICE, AND STORAGE MEDIUM

(71) Applicant: Beijing Bytedance Network Technology Co., Ltd., Beijing (CN)

(72) Inventors: Lei Li, Beijing (CN); Jun Cao, Beijing (CN); Mingxuan Wang, Beijing (CN); Zhou Qian, Beijing (CN)

(73) Assignee: Beijing Bytedance Network Technology Co., Ltd. (CN)

( * ) Notice: Subject to any disclaimer, the term of this patent is extended or adjusted under 35 U.S.C. 154(b) by 413 days.

(21) Appl. No.: 17/186,788

(22) Filed: Feb. 26, 2021

(65) Prior Publication Data

US 2021/0272342 A1 Sep. 2, 2021

(30) Foreign Application Priority Data

Feb. 28, 2020 (CN) .......................... 202010130584.X

(51) Int. Cl.
| | |
|---|---|
| *G06T 7/70* | (2017.01) |
| *G06F 40/166* | (2020.01) |
| *G06F 40/47* | (2020.01) |
| *G06F 40/58* | (2020.01) |
| *G06N 3/08* | (2023.01) |
| *G06N 20/00* | (2019.01) |

(Continued)

(52) U.S. Cl.
CPC ............ *G06F 40/58* (2020.01); *G06F 40/166* (2020.01); *G06F 40/47* (2020.01); *G06N 20/00* (2019.01);
(Continued)

(58) Field of Classification Search
CPC ...... G06F 40/166; G06F 40/47; G06F 40/103; G06N 20/00; G06N 3/08; G06N 3/044;
(Continued)

(56) References Cited

U.S. PATENT DOCUMENTS

| | | | |
|---|---|---|---|
| 2009/0110268 A1* | 4/2009 | Dejean | G06V 30/416 382/159 |
| 2015/0127320 A1* | 5/2015 | Seo | G06F 40/58 704/2 |

(Continued)

FOREIGN PATENT DOCUMENTS

| | | |
|---|---|---|
| CN | 105279152 A | 1/2016 |
| CN | 108182183 A | 6/2018 |

(Continued)

OTHER PUBLICATIONS

CN Search Report dated Mar. 1, 2023 in CN Appl. No. 202010130584. X, English Translation (4 pages).
(Continued)

*Primary Examiner* — Akwasi M Sarpong
*Assistant Examiner* — Michael L Burleson

(57) ABSTRACT

Provided are a method and apparatus for translating words in a picture, an electronic device, and a storage medium. The method includes: recognizing words embedded in a target picture to obtain at least one text line, each of which corresponds to one line of words; perform paragraph combination on the at least one text line to obtain at least one text paragraph; translating the at least one text paragraph into at least one target text paragraph in a specified language; and replacing the words in the target picture with the at least one target text paragraph.

15 Claims, 3 Drawing Sheets

(51) Int. Cl.
  *G06T 11/60* (2006.01)
  *G06V 30/10* (2022.01)
  *G06V 30/19* (2022.01)
  *G06V 30/40* (2022.01)
  *G06V 30/413* (2022.01)

(52) U.S. Cl.
  CPC ............... *G06T 7/70* (2017.01); *G06T 11/60* (2013.01); *G06V 30/19173* (2022.01); *G06V 30/40* (2022.01); *G06V 30/413* (2022.01); *G06N 3/08* (2013.01); *G06T 2207/30176* (2013.01); *G06V 30/10* (2022.01)

(58) Field of Classification Search
  CPC .. G06N 5/01; G06T 7/70; G06T 11/60; G06T 2207/30176; G06V 30/413; G06V 30/10
  See application file for complete search history.

(56) References Cited

U.S. PATENT DOCUMENTS

2019/0311210 A1* 10/2019 Chatterjee .............. G06N 3/045
2021/0097143 A1* 4/2021 Dozier, III .............. G06F 40/42

FOREIGN PATENT DOCUMENTS

| | | |
|---|---|---|
| CN | 108182184 A | 6/2018 |
| CN | 109032465 A | 12/2018 |
| CN | 109697291 A | 4/2019 |
| CN | 110674814 A | 1/2020 |

OTHER PUBLICATIONS

CN Office Action dated Mar. 8, 2023 in CN Appl. No. 202010130584.X, English Translation (14 pages).
CN Supplemental Search Report dated Aug. 28, 2023 in CN Appl. No. 202010130584.X, English Translation (4 pages).
CN Office Action dated Sep. 2, 2023 in CN Appl. No. 202010130584.X, English Translation (17 pages).
Chinese Supplemental Search Report dated Jan. 18, 2024 in Chinese Application No. 202010130584.X, with English Translation (4 pages).

* cited by examiner

METHOD FOR TRANSLATING WORDS IN A PICTURE, ELECTRONIC DEVICE, AND STORAGE MEDIUM

CROSS-REFERENCE TO RELATED APPLICATIONS

This application claims priority to Chinese patent application No. 202010130584.X filed with the CNIPA on Feb. 28, 2020, the disclosure of which is incorporated herein by reference in its entirety.

TECHNICAL FIELD

The present disclosure relates to the field of computer applications and, in particular, to a method for translating words in a picture, an electronic device, and a storage medium.

BACKGROUND

As internationalization deepens, users in different countries exchange information more and more frequently and need to share resources such as scanned files, pictures with words, PowerPoint (PPT) files, and videos with subtitles from time to time.

These resources include words in a particular language. If these resources are shared with a user speaking a different language, the words in these resources need to be translated into the corresponding content in the language of the user.

SUMMARY

In view of this, embodiments of the present disclosure provide a method and apparatus for translating words in a picture, an electronic device, and a storage medium, so as to adjust words embedded in a picture or a video according to users speaking different languages and to expand a propagation range of information in the picture or the video.

Other features and advantages of the embodiments of the present disclosure become apparent through the following detailed description or partly obtained through the practice of the embodiments of the present disclosure.

In an embodiment, the present disclosure provides a method for translating words in a picture. The method includes steps described below, words embedded in a target picture are recognized to obtain at least one text line, each of the at least one text line corresponds to one line of words; paragraph combination is performed on the at least one text line to obtain at least one text paragraph; the at least one text paragraph is translated into at least one target text paragraph in a specified language; and the words in the target picture is replaced with the at least one target text paragraph.

In an embodiment, the present disclosure further provides an apparatus for translating words in a picture. The apparatus includes a text line recognition unit, a paragraph combination unit, a word translation unit, and a word replacement unit. The text line recognition unit is configured to recognize words embedded in a target picture to obtain at least one text line, each of the at least one text line corresponds to one line of words. The paragraph combination unit is configured to perform paragraph combination on the at least one text line to obtain at least one text paragraph. The word translation unit is configured to translate the at least one text paragraph into at least one target text paragraph in a specified language. The word replacement unit is configured to replace the words in the target picture with the at least one target text paragraph.

In the present disclosure, an electronic device is provided. The electronic device includes a processor and a memory. The memory is configured to store an executable instruction which, when executed by the processor, causes the electronic device to perform the above-mentioned method.

In the present disclosure, a computer-readable storage medium is provided. The computer-readable storage medium has a computer program stored thereon, where the computer program, when executed by a processor, implements the above-mentioned method.

In the present disclosure, the words embedded in the target picture are recognized to obtain the at least one text line, the paragraph combination is performed on the at least one text line to obtain the at least one text paragraph, the at least one text paragraph is translated into the at least one target text paragraph in the specified language, and the words in the target picture are replaced with the at least one target text paragraph, so that the words embedded in the picture or the video can be adjusted according to users speaking different languages, and the propagation range of information in the picture or the video can be expanded.

BRIEF DESCRIPTION OF DRAWINGS

To illustrate schemes in the embodiments of the present disclosure more clearly, the accompanying drawings used in the description of the embodiments of the present disclosure will be briefly described below. Apparently, the accompanying drawings described below illustrate only part of embodiments of the present disclosure. Those of ordinary skill in the art may obtain other accompanying drawings based on the embodiments of the present disclosure and the accompanying drawings described below on the premise that no creative work is done.

DETAILED DESCRIPTION

To make adopted schemes, and achieved effects of embodiments of the present disclosure clearer, schemes in the embodiments of the present disclosure will be further described in detail below in conjunction with the accompanying drawings. Apparently, the embodiments described below are part, not all, of the embodiments of the present disclosure. All other embodiments obtained by those skilled in the art based on the embodiments of the present disclosure without doing creative work fall within the scope of the present disclosure.

It is to be noted that the terms "system" and "network" are generally used interchangeably in the embodiments of the present disclosure. The term "and/or" mentioned in the embodiments of the present disclosure refers to any or all combinations of one or more relevant items listed. The terms such as "first" and "second" in the description, claims, and accompanying drawings of the present disclosure are used to distinguish between different objects and not to limit a particular order.

It is to be further noted that the embodiments of the present disclosure may be implemented separately or implemented in combination with each other, which is not limited in the embodiments of the present disclosure.

The names of messages or information exchanged between multiple apparatuses in the embodiments of the present disclosure are only for illustrative objects and not intended to limit the scope of such messages or information.

The schemes in the embodiments of the present disclosure are further described below through implementations in conjunction with the accompanying drawings.

Figure 1:
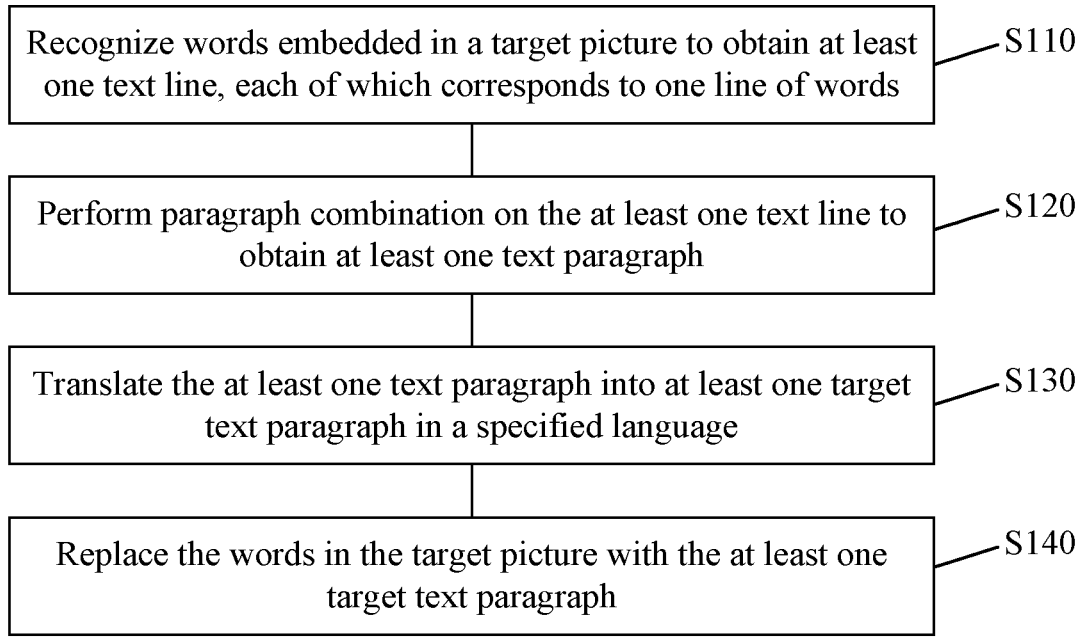
FIG. 1 is a flowchart of a method for translating words in a picture according to an embodiment of the present disclosure.

FIG. 1 shows a flowchart of a method for translating words in a picture according to an embodiment of the present disclosure. This embodiment is applicable to the case where words in a picture are replaced with words in another language. The method may be performed by an apparatus for translating words in a picture and configured in an electronic device. As shown in FIG. 1, the method for translating words in a picture in this embodiment includes steps described below.

In step S110, words embedded in a target picture are recognized to obtain at least one text line, where each of the at least one text line corresponds to one line of words. An object of this step is to obtain a text line corresponding to each line of words, where the words are recognized by multiple methods, for example, the words may be recognized through an optical character recognition (OCR) technology or a machine learning model for word recognition.

In step S120, paragraph combination is performed on the at least one text line is to obtain at least one text paragraph. Text lines may be combined into paragraphs by multiple methods. For example, the paragraph combination may be performed through a machine learning model for combining the text lines into the paragraphs. In another example, the paragraph combination may be performed according to characteristics such as whether an ending character of a text line is a period, a semantic relationship with an adjacent text line, and a position relationship with the adjacent text line.

In step S130, the at least one text paragraph is translated into at least one target text paragraph in a specified language. In some embodiments, the electronic device performing the method may translate text paragraphs into target text paragraphs by using a pre-trained translation model. For example, the translation model may adopt a neural network-based seq2seq model, a statistical translation model, and the like.

It is to be noted that the embodiments of the present disclosure are not limited to the use of the translation model to translate each text paragraph into the target text paragraph, but other manners may be adopted to implement a translation operation, such as a rule-based machine translation method.

In step S140, the words in the target picture are replaced with the at least one target text paragraph. The electronic device performing the method may erase the words in the target picture, typeset the at least one target text paragraph, and embed the at least one target text paragraph in the target picture. In this way, the translated words in the target picture are located at original positions.

It is to be noted that typesetting may include adjusting a page margin, adjusting a frame margin, adjusting a line margin, kerning, scaling, and the like. The at least one target text paragraph may be typeset according to a typesetting style of the words in the target picture, so as to maintain an original typesetting style of the target picture and increase the consistency in picture style.

It is to be noted that after the words are recognized in step S110, the recognition result of lines of words is obtained. However, the words in the picture are organized in paragraphs. Generally, one paragraph corresponds to multiple lines of words. The multiple lines of words recognized from the same paragraph are originally semantically coherent. If the translation is performed line by line, the translated line may be an incomplete sentence and the translation may have an inaccurate result. Based on at least the preceding reason, the paragraph combination is performed to obtain the text paragraphs in step S120 and the translation is performed in step S130, which can enhance the accuracy of the translation result and improve translation quality.

In this embodiment, the words embedded in the target picture are recognized to obtain the at least one text line, the paragraph combination is performed on the at least one text line to obtain the at least one text paragraph, the at least one text paragraph is translated into the at least one target text paragraph in the specified language, and the words in the target picture are replaced with the at least one target text paragraph, so that words embedded in a picture or a video can be adjusted according to a user speaking a different language, and a propagation range of information in the picture or the video can be expanded.

Figure 2:
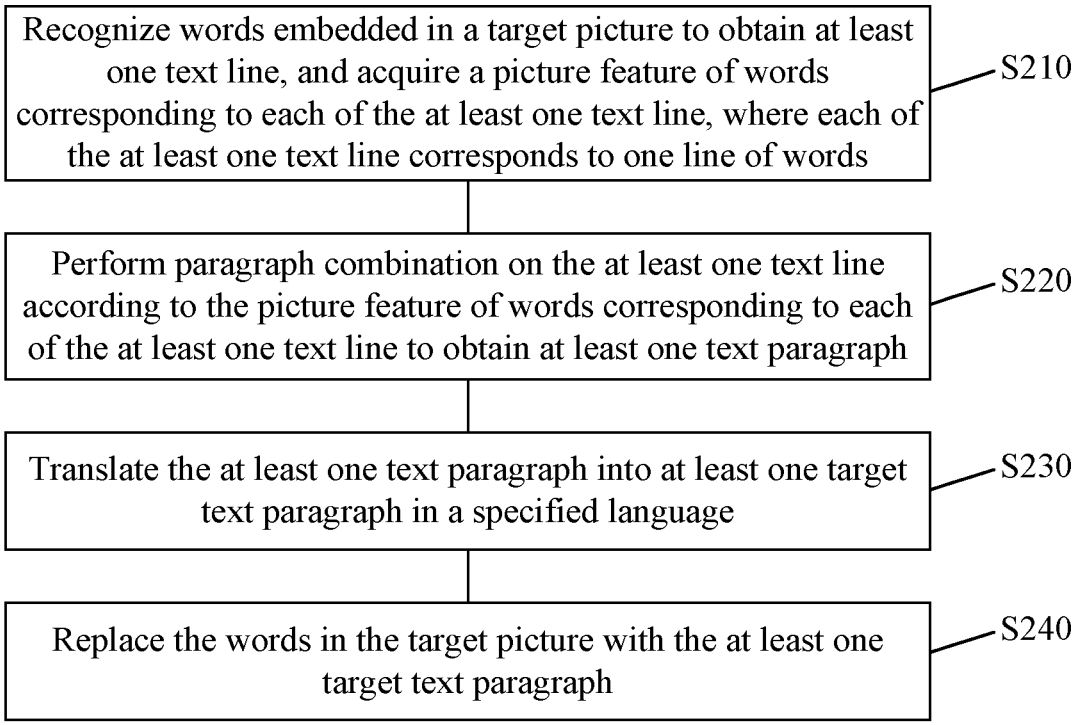
FIG. 2 is a flowchart of another method for translating words in a picture according to an embodiment of the present disclosure.

FIG. 2 shows a flowchart of another method for translating words in a picture according to an embodiment of the present disclosure. This embodiment is improved and optimized based on the preceding embodiment. As shown in FIG. 2, the method for translating words in the picture in this embodiment includes steps described below.

In step S210, words embedded in a target picture are recognized to obtain at least one text line, and a picture feature of words corresponding to each of the at least one text line is acquired, where each of the at least one text line corresponds to one line of words. The picture feature may include one or more of a page margin, a font size, a font color, a line spacing with an adjacent line, or the like.

This step may be implemented using an OCR technology or a machine learning model. For example, a machine learning model for word recognition may be trained by the following method: a picture containing at least one text line is acquired as a training sample, and content of each text line contained in the picture and a picture feature of words corresponding to each text line are used as sample annotations; an initialized machine learning model including target layers for outputting the content of each text line contained in the picture and the picture feature of words corresponding to each text line is determined; the machine learning model is trained by a machine learning method, using a picture in a training sample in a training sample set as the input of the initialized machine learning model, and using the content of each text line and the picture feature of words corresponding to each text line which correspond to the inputted picture as the desired output of the initialized machine learning model.

After the machine learning model for word recognition is trained, the target picture is inputted into the machine learning model, and the machine learning model outputs the at least one text line contained in the target picture and the picture feature of words corresponding to each of the at least one text line.

In step S220, paragraph combination is performed on the at least one text line according to the picture feature of words corresponding to each of the at least one text line to obtain at least one text paragraph. In this step, the paragraph combination may be performed according to characteristics such as whether an ending character of a text line is a period, a semantic relationship with an adjacent text line, and a position relationship with the adjacent text line.

For example, if a paragraph feature of the words is a regular paragraph format such as an indentation of a predetermined character at the beginning of a paragraph (for example, a regular indentation of two characters in Chinese), and the picture feature includes the page margin. If a page margin of words corresponding to a certain text line determines an indentation of two characters at the beginning of the text line, it is determined that the text line belongs to a new paragraph rather than a paragraph where a previous text line is located. If a page margin of words corresponding to a certain text line determines no indentation at the beginning of the text line, it is determined that the text line belongs to a paragraph where a previous text line is located. In another example, if adjacent paragraphs of words are distinguished by different fonts or font colors, whether a text line belongs to the same paragraph as an adjacent text line may be determined according to whether a font or font color of the text line is consistent with that of the adjacent text line. In another example, if a paragraph spacing and a line spacing of the words are different, whether a text line belongs to the same paragraph as a previous text line may be determined according to a spacing between the text line and the previous text line.

In another example, this step may also be implemented by a machine learning model. For example, a machine learning model for combining text lines into paragraphs may be trained by a method described below. Position information of text lines in the picture and position information of text paragraphs after combination are manually labelled and a picture training set for paragraph combination is constructed. A decision tree rule model is established by using picture features such as a left margin, right margin, line spacing, height spacing, width spacing and font size of the text lines to determine whether adjacent text lines need to be combined, and parameters of the decision tree rule model are adjusted through a picture test set.

After the machine learning model for combining text lines into paragraphs is trained, the at least one text line in the target picture and the picture feature of words corresponding to each of the at least one text line are inputted into the machine learning model, and the machine learning model outputs the at least one text paragraph.

In step S230, the at least one text paragraph is translated into at least one target text paragraph in a specified language. In some embodiments, an electronic device performing the method may translate text paragraphs into target text paragraphs by using a neural network-based seq2seq model, a statistical translation model, or the like.

In step S240, the words in the target picture are replaced with the at least one target text paragraph. The electronic device performing the method may erase the words in the target picture, typeset the at least one target text paragraph according to the original picture feature such as the page margin, font size, font color, and line spacing with the adjacent line, and embed the at least one typeset target text paragraph in the target picture, which can maintain an original feature of the target picture and increase the consistency between an original picture and a picture after translation.

In this embodiment based on the preceding embodiment, after a text line is obtained, the picture feature such as the page margin, font size, font color, and line spacing with the adjacent line corresponding to the text line is acquired, and the paragraph combination is performed according to the picture feature corresponding to each text line, so that words embedded in a picture or a video can be adjusted according to users speaking different languages, and a propagation range of information in the picture or the video can be expanded.

Figure 3:
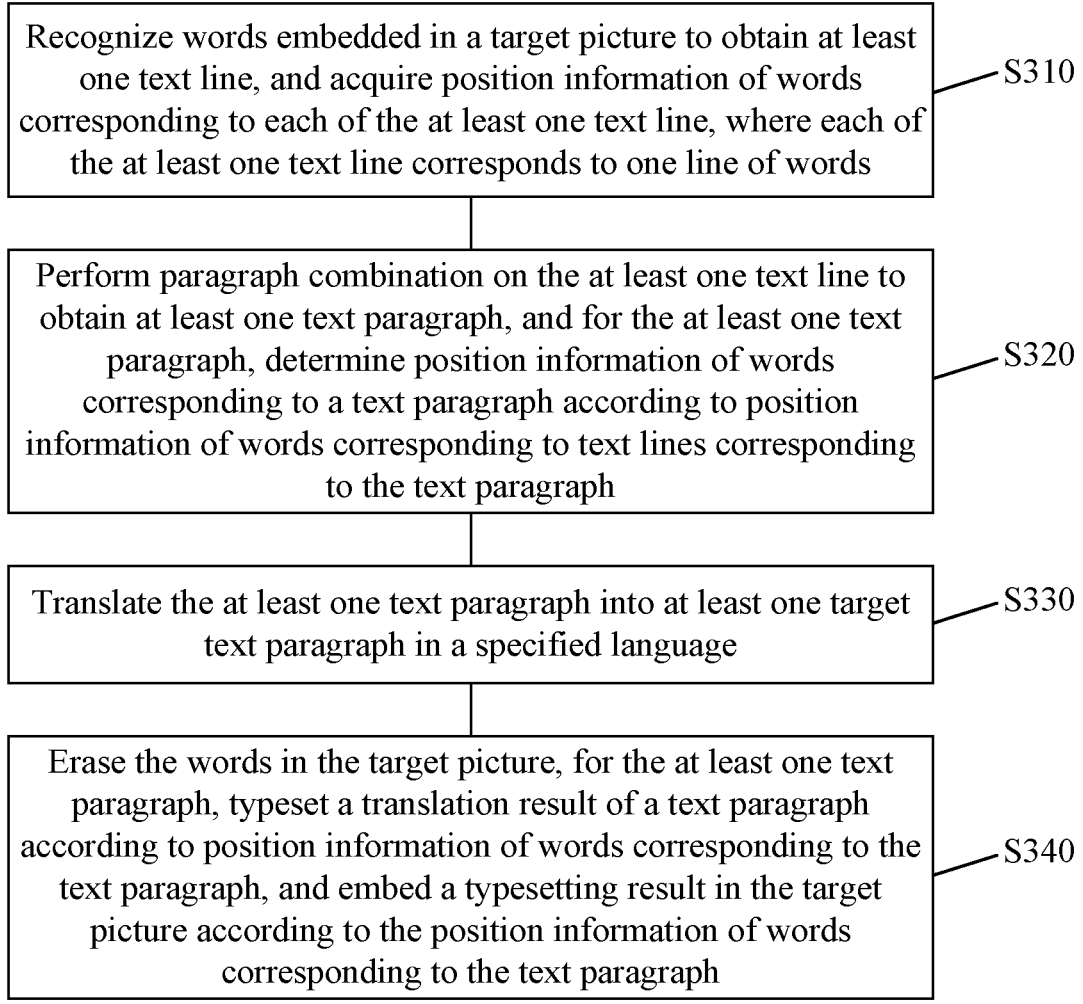
FIG. 3 is a flowchart of another method for translating words in a picture according to an embodiment of the present disclosure.

FIG. 3 shows a flowchart of another method for translating words in a picture according to an embodiment of the present disclosure. This embodiment is improved and optimized based on the preceding embodiment. As shown in FIG. 3, the method for translating words in a picture in this embodiment includes steps described below.

In step S310, words embedded in a target picture are recognized to obtain at least one text line, and position information of words corresponding to each of the at least one text line is acquired, where each of the at least one text line corresponds to one line of words.

In step S320, paragraph combination is performed on the at least one text line to obtain at least one text paragraph, and for any one of the at least one text paragraph, position information of words corresponding to the one text paragraph is determined according to position information of words corresponding to text lines corresponding to the one text paragraph. That is, position information of words corresponding to text lines corresponding to a paragraph is acquired and a union among text lines is acquired.

In step S330, the at least one text paragraph is translated into at least one target text paragraph in a specified language. In some embodiments, an electronic device performing the method may translate text paragraphs into target text paragraphs by using a neural network-based seq2seq model, a statistical translation model, or the like.

In step S340, the words in the target picture are erased, for the at least one text paragraph, a translation result of a text paragraph is typeset according to position information of words corresponding to the text paragraph, and a typesetting result is embedded in the target picture according to the position information of words corresponding to the text paragraph.

For example, the typesetting includes one or more typesetting operations such as adjusting a page margin, adjusting a frame margin, adjusting a line margin, kerning, and scaling.

In this embodiment based on the preceding embodiment, after text lines are obtained, the position information of words corresponding to each text line is acquired and position information of words corresponding to any text paragraph is determined according to position information of words corresponding to text lines corresponding to the combined paragraph so that the translation result of the text paragraph is typeset. Therefore, a style of an original picture can be maintained after the translation result is embedded in the target picture, and the processing quality of pictures can be improved.

Figure 4:
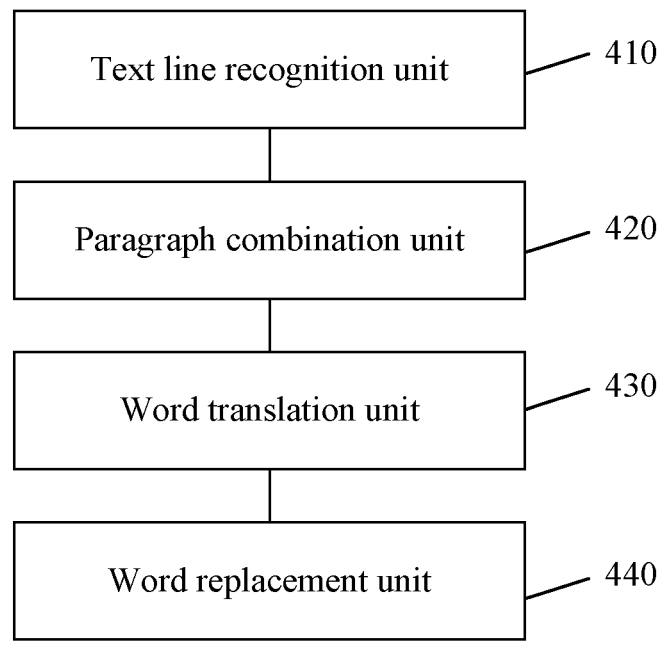
FIG. 4 is a structure diagram of an apparatus for translating words in a picture according to an embodiment of the present disclosure.

As an implementation of the method shown in each of the above drawings, the present application provides an embodiment of an apparatus for translating words in a picture. FIG. 4 shows a structure diagram of an apparatus for translating words in a picture according to this embodiment. The apparatus embodiment corresponds to the method embodiments shown in FIGS. 1 to 3. The apparatus is applicable to various electronic devices. As shown in FIG. 4, the apparatus for translating words in a picture in this embodiment includes a text line recognition unit 410, a paragraph combination unit 420, a word translation unit 430, and a word replacement unit 440.

The text line recognition unit 410 is configured to recognize words embedded in a target picture to obtain at least one text line, each of which corresponds to one line of words.

The paragraph combination unit 420 is configured to perform paragraph combination on the at least one text line to obtain at least one text paragraph.

The word translation unit 430 is configured to translate the at least one text paragraph into at least one target text paragraph in a specified language. The word replacement unit 440 is configured to replace the words in the target picture with the at least one target text paragraph.

In an embodiment, the text line recognition unit 410 is further configured to: after the at least one text line is obtained, acquire a picture feature of words corresponding to each of the at least one text line, where the picture feature includes at least one of a page margin, a font size, a font color, or a line spacing with an adjacent line. The paragraph combination unit 420 is further configured to perform the paragraph combination on the at least one text line according to the picture feature of words corresponding to each of the at least one text line.

In an embodiment, the text line recognition unit 410 is further configured to recognize the words embedded in the target picture through a machine learning model for word recognition to obtain the at least one text line and the picture feature of words corresponding to each of the at least one text line.

In an embodiment, the paragraph combination unit 420 is further configured to perform the paragraph combination on the at least one text line according to the picture feature of words corresponding to each of the at least one text line through a machine learning model for combining text lines into paragraphs.

In an embodiment, the text line recognition unit 410 is further configured to: after the at least one text line is obtained, acquire position information of words corresponding to each of the at least one text line, and for the at least one text paragraph, determine position information of words corresponding to any text paragraph according to position information of words corresponding to text lines corresponding to the text paragraph. The word replacement unit 440 is further configured to erase the words in the target picture, for the at least one text paragraph, typeset a translation result of any text paragraph according to position information of words corresponding to the text paragraph, and embed a typesetting result in the target picture according to the position information of words corresponding to the text paragraph.

Further, the typesetting includes at least one of adjusting a page margin, adjusting a frame margin, adjusting a line margin, kerning, or scaling.

The apparatus for translating words in the picture provided by this embodiment can perform the method for translating words in the picture provided by the method embodiments of the present disclosure and has function modules and beneficial effects corresponding to the performed method.

Figure 5:
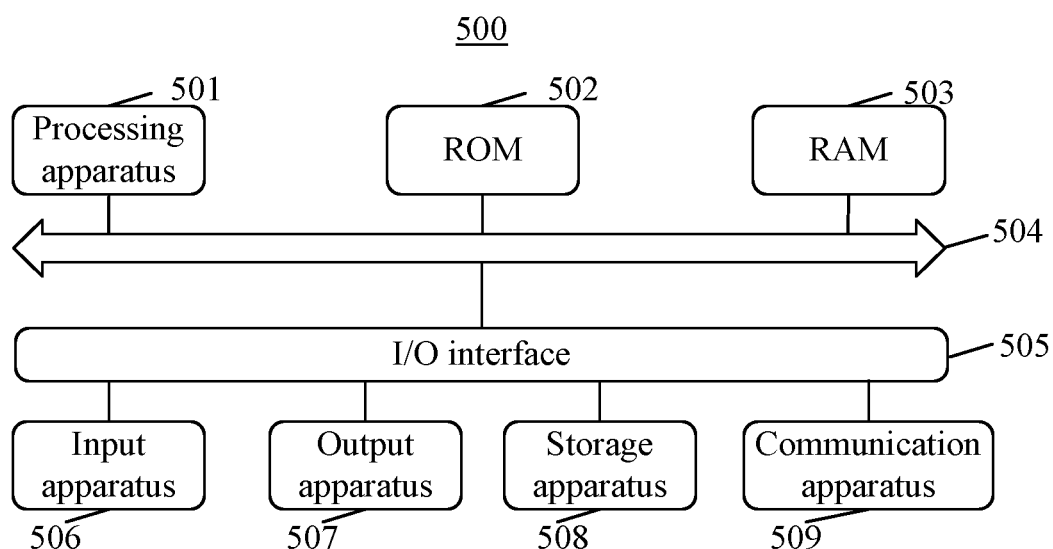
FIG. 5 is a structure diagram of an electronic device for implementing an embodiment of the present disclosure.

FIG. 5 shows a structure diagram of an electronic device 500 for implementing an embodiment of the present disclosure. A terminal device in the embodiments of the present disclosure may include, but is not limited to, mobile terminals such as a mobile phone, a laptop, a digital broadcast receiver, a personal digital assistant (PDA), a Pad, a portable media player (PMP), and an in-vehicle terminal (such as an in-vehicle navigation terminal) and stationary terminals such as a digital television (TV) and a desktop computer. The electronic device shown in FIG. 5 is merely an example and is not intended to limit the function and usage scope of the embodiments of the present disclosure.

As shown in FIG. 5, the electronic device 500 may include a processing apparatus 501 (such as a central processing unit and a graphics processing unit). The processing apparatus 501 may perform various types of appropriate operations and processing based on a program stored in a read-only memory (ROM) 502 or a program loaded from a storage apparatus 508 to a random-access memory (RAM) 503. Various programs and data required for the operation of the electronic device 500 are also stored in the RAM 503. The processing apparatus 501, the ROM 502, and the RAM 503 are connected to each other through a bus 504. An input/output (I/O) interface 505 is also connected to the bus 504.

Generally, the following apparatus may be connected to the I/O interface 505: an input apparatus 506 such as a touch screen, a touch pad, a keyboard, a mouse, a camera, a microphone, an accelerometer, and a gyroscope, an output apparatus 507 such as a liquid crystal display (LCD), a speaker, and a vibrator, the storage apparatus 508 such as a magnetic tape and a hard disk, and a communication apparatus 509. The communication apparatus 509 may allow the electronic device 500 to perform wireless or wired communication with other devices to exchange data. Although FIG. 5 shows the electronic device 500 having various apparatuses, it is to be understood that all of the apparatuses shown herein need not be implemented or present. Alternatively, more or fewer apparatuses may be implemented or present.

Particularly, according to the embodiments of the present disclosure, the process described above with reference to the flowchart may be implemented as a computer software program. For example, the embodiments of the present disclosure include a computer program product. The computer program product includes a computer program carried on a computer-readable medium. The computer program includes program codes for performing the method shown in the flowcharts. In such an embodiment, the computer program may be downloaded from a network and installed through the communication apparatus 509, or may be installed from the storage apparatus 508, or may be installed from the ROM 502. When the computer program is executed by the processing apparatus 501, the preceding functions defined in the methods of the embodiments of the present disclosure are performed.

It is to be noted that the computer-readable medium described above in the embodiments of the present disclosure may be a computer-readable signal medium or a computer-readable storage medium or any combination thereof. The computer-readable storage medium, for example, may be, but is not limited to, an electrical, magnetic, optical, electromagnetic, infrared, or semiconductor system, apparatus, or device, or any combination thereof. More examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. In the embodiments of the present disclosure, the computer-readable storage medium may be any tangible medium including or storing a program. The program may be used by or in conjunction with an instruction execution system, apparatus, or device. In the embodiments of the present disclosure, the computer-readable signal medium may include a data signal propagated on a base band or as part of a carrier.

Computer-readable program codes are carried in the data signal. The data signal propagated in this manner may be in multiple forms and includes, but is not limited to, an electromagnetic signal, an optical signal, or any appropriate combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

The computer-readable medium may be included in the electronic device or may exist alone without being assembled into the electronic device.

The computer-readable medium carries one or more programs, where the one or more programs, when executed by the electronic device, cause the electronic device to recognize words embedded in a target picture to obtain at least one text line, each of the at least one text line corresponds to one line of words; perform paragraph combination on the at least one text line to obtain at least one text paragraph; translate the at least one text paragraph into at least one target text paragraph in a specified language; and replace the words in the target picture with the at least one target text paragraph.

Computer program codes for performing the operations in the embodiments of the present disclosure may be complied in one or more programming languages or combinations thereof. The one or more programming languages include object-oriented programming languages such as Java, Smalltalk, C++ and conventional procedural programming languages such as "C" or similar programming languages. The program codes may be executed entirely on a user computer, partly on the user computer, as a stand-alone software package, partly on the user computer and partly on a remote computer, or entirely on the remote computer or server. In the case where the remote computer is involved, the remote computer may be connected to the user computer via any type of network including a local area network (LAN) or a wide area network (WAN), or the remote computer may be connected to an external computer (for example, through the Internet using an Internet service provider).

The flowcharts and block diagrams among the drawings illustrate the architecture, functionality, and operation of possible implementations of systems, methods, and computer program products according to various embodiments of the present disclosure. In this regard, each block in the flowcharts or block diagrams may represent one module, program segment, or portion of code, which includes one or more executable instructions for implementing specified logical functions. It is also to be noted that in some alternative implementations, the functions in the blocks may occur in sequences different from those shown in the drawings. For example, two successive blocks may in fact be executed substantially at the same time or in reverse order, which depends on the functionality involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The names of the units do not constitute a limitation on the units themselves. For example, a first acquisition unit may also be described as "a unit for acquiring at least two Internet protocol addresses".

According to one or more embodiments of the present disclosure, in the method for translating words in the picture, after the at least one text line is obtained, the method further includes: acquiring a picture feature of words corresponding to each of the at least one text line, where the picture feature includes at least one of a page margin, a font size, a font color, or a line spacing with an adjacent line. The step of performing the paragraph combination on the at least one text line includes: performing the paragraph combination on the at least one text line according to the picture feature of words corresponding to each of the at least one text line.

According to one or more embodiments of the present disclosure, in the method for translating words in the picture, the steps of recognizing the words embedded in the target picture to obtain the at least one text line and acquiring the picture feature of words corresponding to each of the at least one text line include: recognizing, through a machine learning model for word recognition, the words embedded in the target picture to obtain the at least one text line and the picture feature of words corresponding to each of the at least one text line.

According to one or more embodiments of the present disclosure, in the method for translating words in the picture, the step of performing the paragraph combination on the at least one text line according to the picture feature of words corresponding to each of the at least one text line includes: performing the paragraph combination on the at least one text line according to the picture feature of words corresponding to each of the at least one text line through a machine learning model for combining text lines into paragraphs.

According to one or more embodiments of the present disclosure, in the method for translating words in the picture, after the at least one text line is obtained, the method further includes: acquiring position information of words corresponding to each of the at least one text line; and for any one of the at least one text paragraph, determining position information of words corresponding to the text paragraph according to position information of words corresponding to text lines corresponding to the text paragraph. The step of replacing the words in the target picture with the at least one target text paragraph includes: erasing the words in the target picture, for the at least one text paragraph, typesetting a translation result of any text paragraph according to position information of words corresponding to the text paragraph, and embedding a typesetting result in the target picture according to the position information of words corresponding to the text paragraph.

According to one or more embodiments of the present disclosure, in the method for translating words in the picture, the typesetting includes at least one of adjusting a page margin, adjusting a frame margin, adjusting a line margin, kerning, or scaling.

According to one or more embodiments of the present disclosure, in the apparatus for translating words in the picture, the text line recognition unit is further configured to: after the at least one text line is obtained, acquire a picture feature of words corresponding to each of the at least one text line, where the picture feature includes at least one of a page margin, a font size, a font color, or a line spacing with an adjacent line. The paragraph combination unit is further configured to perform the paragraph combination on the at least one text line according to the picture feature of words corresponding to each of the at least one text line.

According to one or more embodiments of the present disclosure, in the apparatus for translating words in the picture, the text line recognition unit is configured to recognize the words embedded in the target picture through a machine learning model for word recognition to obtain the at least one text line and the picture feature of words corresponding to each of the at least one text line.

According to one or more embodiments of the present disclosure, in the apparatus for translating words in the picture, the paragraph combination unit is configured to perform the paragraph combination on the at least one text line according to the picture feature of words corresponding to each of the at least one text line through a machine learning model for combining text lines into paragraphs.

According to one or more embodiments of the present disclosure, in the apparatus for translating words in the picture, the text line recognition unit is further configured to: after the at least one text line is obtained, acquire position information of words corresponding to each of the at least one text line, and for any text paragraph of the at least one text paragraph, determine position information of words corresponding to the text paragraph according to position information of words corresponding to text lines corresponding to the text paragraph. The word replacement unit is configured to erase the words in the target picture, for any one of the at least one text paragraph, typeset a translation result of the text paragraph according to position information of words corresponding to the text paragraph, and embed a typesetting result in the target picture according to the position information of words corresponding to the text paragraph.

According to one or more embodiments of the present disclosure, in the apparatus for translating words in the picture, the typesetting includes at least one of adjusting a page margin, adjusting a frame margin, adjusting a line margin, kerning, or scaling.

The above description is merely illustrative of exemplary embodiments of the present disclosure and the technical principles used therein. Those skilled in the art should understand that the scope referred to in the embodiments of the present disclosure is not limited to the solutions formed by a particular combination of the features described above and should cover other solutions formed by any combination of the features described above or their equivalent features without departing from the concept of the present disclosure. For example, the other solutions may be solutions formed by mutual substitutions between the features described above and the features that are disclosed in the embodiments of the present disclosure and (may not necessarily) have similar functions.

What is claimed is:

1. A method for translating words in a picture, comprising:
   recognizing words embedded in a target picture to obtain at least one text line, wherein each of at least one text line corresponds to one line of words;
   performing paragraph combination on the at least one text line to obtain at least one text paragraph;
   translating the at least one text paragraph into at least one target text paragraph in a specified language; and
   replacing the words in the target picture with the at least one target text paragraph;
   wherein after obtaining the at least one text line, the method further comprises:
   acquiring position information of words corresponding to each of the at least one text line;
   wherein after obtaining the at least one text paragraph, the method further comprises:
   for any text paragraph of the at least one text paragraph, determining position information of words corresponding to the text paragraph in the picture according to position information of words corresponding to text lines corresponding to the text paragraph in the picture; and
   wherein replacing the words in the target picture with the at least one target text paragraph comprises:
   erasing the words in the target picture, for the at least one text paragraph, typesetting a translation result of the at least one text paragraph according to position information of words corresponding to the at least one text paragraph, and embedding a typesetting result in the target picture according to the position information of words corresponding to the at least one text Paragraph.

2. The method according to claim 1, after obtaining the at least one text line, further comprising:
   acquiring a picture feature of words corresponding to each of the at least one text line, wherein the picture feature comprises at least one of a page margin, a font size, a font color, or a line spacing with an adjacent line;
   wherein performing the paragraph combination on the at least one text line comprises:
   performing the paragraph combination on the at least one text line according to the picture feature of words corresponding to each of the at least one text line.

3. The method according to claim 2, wherein recognizing the words embedded in the target picture to obtain the at least one text line and acquiring the picture feature of words corresponding to each of the at least one text line comprise:
   recognizing, through a machine learning model for word recognition, the words embedded in the target picture to obtain the at least one text line and the picture feature of words corresponding to each of the at least one text line.

4. The method according to claim 2, wherein performing the paragraph combination on the at least one text line according to the picture feature of words corresponding to each of the at least one text line comprises:
   performing, through a machine learning model for combining text lines into paragraphs, the paragraph combination on the at least one text line according to the picture feature of words corresponding to each of the at least one text line.

5. The method according to claim 1, wherein the typesetting comprises at least one of adjusting a page margin, adjusting a frame margin, adjusting a line margin, kerning, or scaling.

6. An electronic device, comprising:
   at least one processor, and
   a memory, which is configured to store an executable instruction which, when executed by the at least one processor, causes the electronic device to implement:
   recognizing words embedded in a target picture to obtain at least one text line, wherein each of at least one text line corresponds to one line of words;
   performing paragraph combination on the at least one text line to obtain at least one text paragraph;
   translating the at least one text paragraph into at least one target text paragraph in a specified language; and
   replacing the words in the target picture with the at least one target text paragraph;

wherein the executable instruction causes the electronic device to further implement:
acquiring position information of words corresponding to each of the at least one text line;
wherein the executable instruction causes the electronic device to further implement:
after obtaining the at least one text paragraph, for any text paragraph of the at least one text paragraph, determining position information of words corresponding to the text paragraph in the picture according to position information of words corresponding to text lines corresponding to the text paragraph in the picture; and
wherein the executable instruction causes the electronic device to implement replacing the words in the target picture with the at least one target text paragraph by:
erasing the words in the target picture, typesetting the at least one target text paragraph according to position information of words corresponding to each of the at least one text paragraph, and embedding the typeset at least one target text paragraph in the target picture according to the position information of words corresponding to each of the at least one text paragraph.

7. The electronic device according to claim 6, wherein the executable instruction causes the electronic device to further implement:
after obtaining the at least one text line, acquiring a picture feature of words corresponding to each of the at least one text line, wherein the picture feature comprises at least one of a page margin, a font size, a font color, or a line spacing with an adjacent line;
wherein the executable instruction causes the electronic device to implement performing the paragraph combination on the at least one text line by:
performing the paragraph combination on the at least one text line according to the picture feature of words corresponding to each of the at least one text line.

8. The electronic device according to claim 7, wherein the executable instruction causes the electronic device to implement recognizing the words embedded in the target picture to obtain the at least one text line and acquiring the picture feature of words corresponding to each of the at least one text line by:
recognizing, through a machine learning model for word recognition, the words embedded in the target picture to obtain the at least one text line and the picture feature of words corresponding to each of the at least one text line.

9. The electronic device according to claim 7, wherein the executable instruction causes the electronic device to implement performing the paragraph combination on the at least one text line according to the picture feature of words corresponding to each of the at least one text line by:
performing, through a machine learning model for combining text lines into paragraphs, the paragraph combination on the at least one text line according to the picture feature of words corresponding to each of the at least one text line.

10. The electronic device according to claim 6, wherein the typesetting comprises at least one of adjusting a page margin, adjusting a frame margin, adjusting a line margin, kerning, or scaling.

11. A non-transitory computer-readable storage medium on which a computer program is stored, wherein the computer program, when executed by a processor, implements:
recognizing words embedded in a target picture to obtain at least one text line, wherein each of at least one text line corresponds to one line of words;
performing paragraph combination on the at least one text line to obtain at least one text paragraph;
translating the at least one text paragraph into at least one target text paragraph in a specified language; and
replacing the words in the target picture with the at least one target text paragraph;
wherein the computer program further implements:
acquiring position information of words corresponding to each of the at least one text line;
wherein the computer program further implements:
after obtaining the at least one text paragraph, for any text paragraph of the at least one text paragraph, determining position information of words corresponding to the text paragraph in the picture according to position information of words corresponding to text lines corresponding to the text paragraph in the picture; and
wherein the computer program implements replacing the words in the target picture with the at least one target text paragraph by:
erasing the words in the target picture, typesetting the at least one target text paragraph, and embedding the typeset at least one target text paragraph in the target picture according to position information of words corresponding to each of the at least one text paragraph.

12. The non-transitory computer-readable storage medium according to claim 11, wherein the computer program further implements:
after obtaining the at least one text line, acquiring a picture feature of words corresponding to each of the at least one text line, wherein the picture feature comprises at least one of a page margin, a font size, a font color, or a line spacing with an adjacent line;
wherein the computer program implements performing the paragraph combination on the at least one text line by:
performing the paragraph combination on the at least one text line according to the picture feature of words corresponding to each of the at least one text line.

13. The non-transitory computer-readable storage medium according to claim 12, wherein the computer program implements recognizing the words embedded in the target picture to obtain the at least one text line and acquiring the picture feature of words corresponding to each of the at least one text line by:
recognizing, through a machine learning model for word recognition, the words embedded in the target picture to obtain the at least one text line and the picture feature of words corresponding to each of the at least one text line.

14. The non-transitory computer-readable storage medium according to claim 12, wherein the computer program implements performing the paragraph combination on the at least one text line according to the picture feature of words corresponding to each of the at least one text line by:
performing, through a machine learning model for combining text lines into paragraphs, the paragraph combination on the at least one text line according to the picture feature of words corresponding to each of the at least one text line.

15. The non-transitory computer-readable storage medium according to claim 11, wherein the typesetting comprises at least one of adjusting a page margin, adjusting a frame margin, adjusting a line margin, kerning, or scaling.

* * * * *